US006152828A

United States Patent [19]
Tomita et al.

[11] Patent Number: 6,152,828
[45] Date of Patent: Nov. 28, 2000

[54] ROCKING DEVICE AND BODILY SENSATION SIMULATION APPARATUS

[75] Inventors: Seijiro Tomita; Ichiro Katagiri, both of Tokyo, Japan

[73] Assignee: Sony Corporation, Tokyo, Japan

[21] Appl. No.: 09/285,370

[22] Filed: Apr. 2, 1999

[30] Foreign Application Priority Data

Apr. 6, 1998 [JP] Japan .................................. 10-093518

[51] Int. Cl.[7] .................................................. A63G 31/16
[52] U.S. Cl. ............................. 472/60; 472/130; 434/55
[58] Field of Search ................................ 472/59, 60, 61, 472/130; 434/29, 55, 56, 58, 62; 463/46

[56] References Cited

U.S. PATENT DOCUMENTS

| | | | |
|---|---|---|---|
| 1,789,680 | 1/1931 | Gwinnett | 472/60 |
| 5,605,462 | 2/1997 | Denne | 434/55 |
| 5,669,773 | 9/1997 | Gluck | 434/62 |
| 5,695,406 | 12/1997 | Park | 472/61 |
| 5,752,834 | 5/1998 | Ling | 434/58 |
| 5,772,513 | 6/1998 | Ohishi | 463/46 |
| 5,857,917 | 1/1999 | Francis et al. | 472/60 |
| 5,860,808 | 1/1999 | Yoshimoto et al. | 434/55 |

*Primary Examiner*—Kien T. Nguyen
*Attorney, Agent, or Firm*—Limbach & Limbach L.L.P.

[57] ABSTRACT

Three driving means for rocking a rocking object are provided, each of the foregoing driving means has a motor and an arm which rotates with one end thereof as an axis by the rotation of the motor, the other end of the foregoing arm is rotatably mounted to the front central portion and the rear both side portions of the foregoing rocking object, and each of the foregoing driving means is drivingly controlled to thereby pitch, roll and heave the foregoing rocking object. Such a rocking device capable of performing complicated operations with simple structure will be provided.

12 Claims, 14 Drawing Sheets

ROCKING DEVICE AND BODILY SENSATION SIMULATION APPARATUS

BACKGROUND OF THE INVENTION

1. Field of the Invention

The present invention relates to a rocking device for rocking and heaving a rocking object, and a bodily sensation simulation apparatus loaded with the rocking device.

2. Description of Related Art

The bodily sensation simulation apparatus is an apparatus in which its user can "pseudo-experience" an actual event, for example, the operation of an airplane or an automobile. Such a bodily sensation simulation apparatus is generally provided with a visual sensation device, an audio device, an operating device and the like.

As an operating device for use with such a bodily sensation simulation apparatus, there is a rocking device which rocks, for example, seats for an airplane or an automobile or a body including the seats, that is, pitches, rolls and heaves to three-dimensionally operate.

A conventional rocking device has been provided with, for example, six-shaft driving means in order to implement the above-described pitching, rolling and heaving, and has been structured to make it possible for the user to pseudo-experience by controlling these driving means respectively.

The conventional rocking device described above has as many driving means as six shafts, and each of these driving means must be controlled, and therefore, the structure, control programs and the like become complicated, leading to a drawback that cost, time and effort will be increased.

SUMMARY OF THE INVENTION

With a view to solving these problems, the present invention is designed and its object is to provide a rocking device capable of performing complicated operations with simple structure, and a bodily sensation simulation apparatus loaded with the rocking device.

In order to achieve the above-described object, a rocking device for rocking a rocking object is provided with three driving means according to the present invention, and is characterized in that each of the foregoing driving means is drivingly controlled respectively to thereby pitch, roll and heave the foregoing rocking object.

Further, in order to achieve the above-described object, a rocking device having three driving means for rocking and heaving a rocking object is structured according to the present invention such that each of the foregoing driving means has a motor and an arm, which rotates with one end thereof as an axis by rotating this motor, respectively, and the other end of each of the foregoing arms is rotatably mounted to the front central portion and the rear both side portions of the foregoing rocking object, respectively, and is characterized in that each of the foregoing driving means is drivingly controlled respectively to thereby pitch, roll and heave the foregoing rocking object.

Furthermore, in order to achieve the above-described object, a bodily sensation simulation apparatus which causes a user to pseudo-experience is according to the present invention, provided with a rocking device, comprising: a visual sensation device for individually displaying a three-dimensional image to the foregoing user; a fixing device which fixes the foregoing user to a predetermined position and is mounted with the foregoing visual sensation device to make it possible for the user to see the foregoing three-dimensional image; and three driving means for rocking and heaving the foregoing fixing device, wherein each of the foregoing driving means has a motor and an arm, which rotates with one end thereof as an axis by rotating this motor, respectively, the other end of each of the foregoing arms is rotatably mounted to the front central portion and the rear both side portions of the foregoing rocking object respectively, and each of the foregoing driving means is drivingly controlled respectively to thereby pitch, roll and heave the foregoing rocking object.

Since pitching, rolling and heaving are enabled by controlling only with three driving means according to the above-described structure, the structure, control programs and the like become simple, and the cost, time and effort can be reduced.

DETAILED DESCRIPTION OF THE PREFERRED EMBODIMENTS

Hereinafter, with reference to the accompanying drawings, the detailed description will be made of the preferred embodiments according to the present invention.

In this respect, the embodiments described below are preferred embodiments according to the present invention, and therefore technically preferable various limitations are imposed. However, the scope of the present invention is not limited to these embodiments in the following descriptions so long as any description to the effect that the present invention is specially limited is not made.

Figure 1:
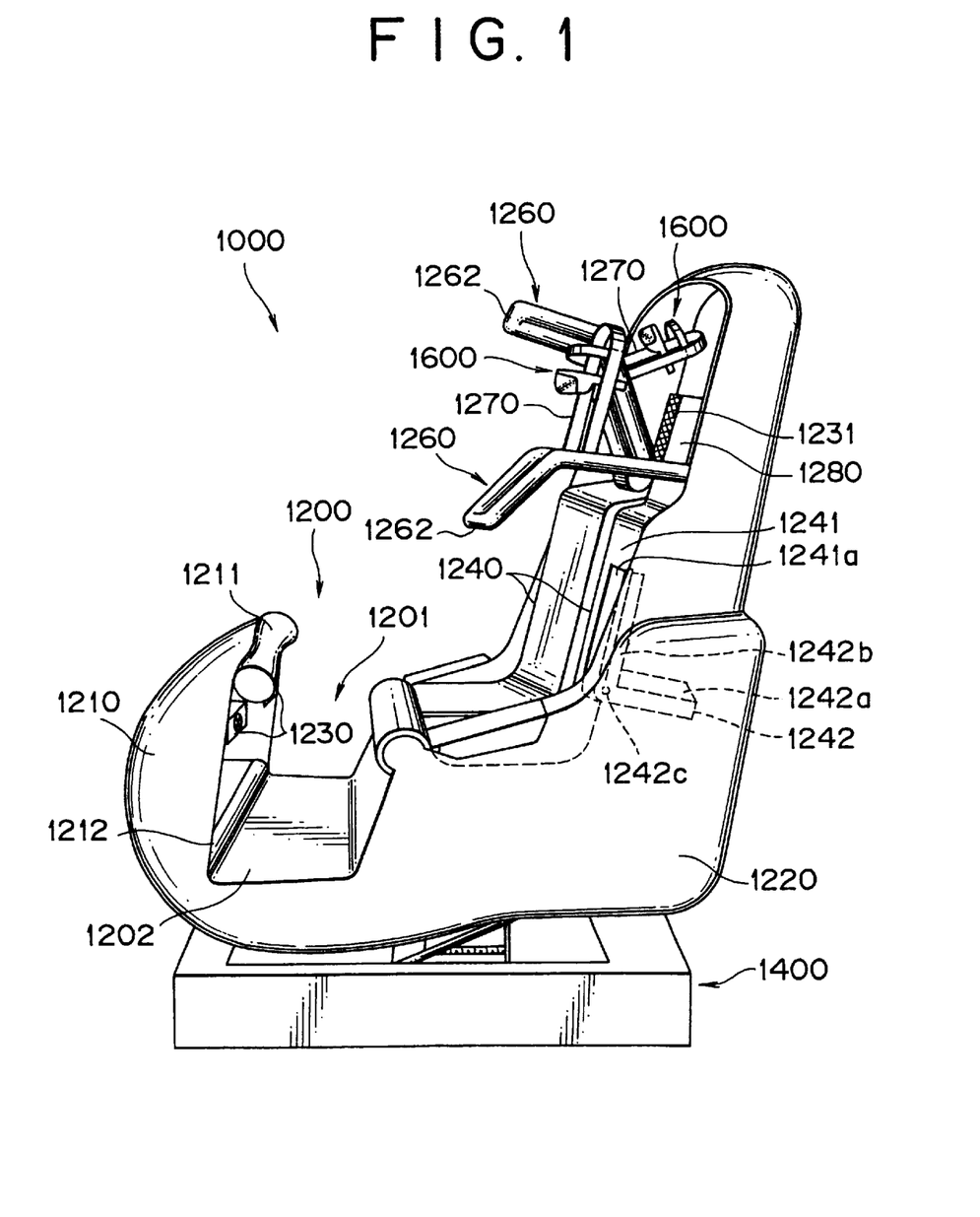
FIG. 1 is a schematic perspective view showing an example of the outer shape of a bodily sensation simulation apparatus loaded with a rocking device according to an embodiment of the present invention.
Figure 2:
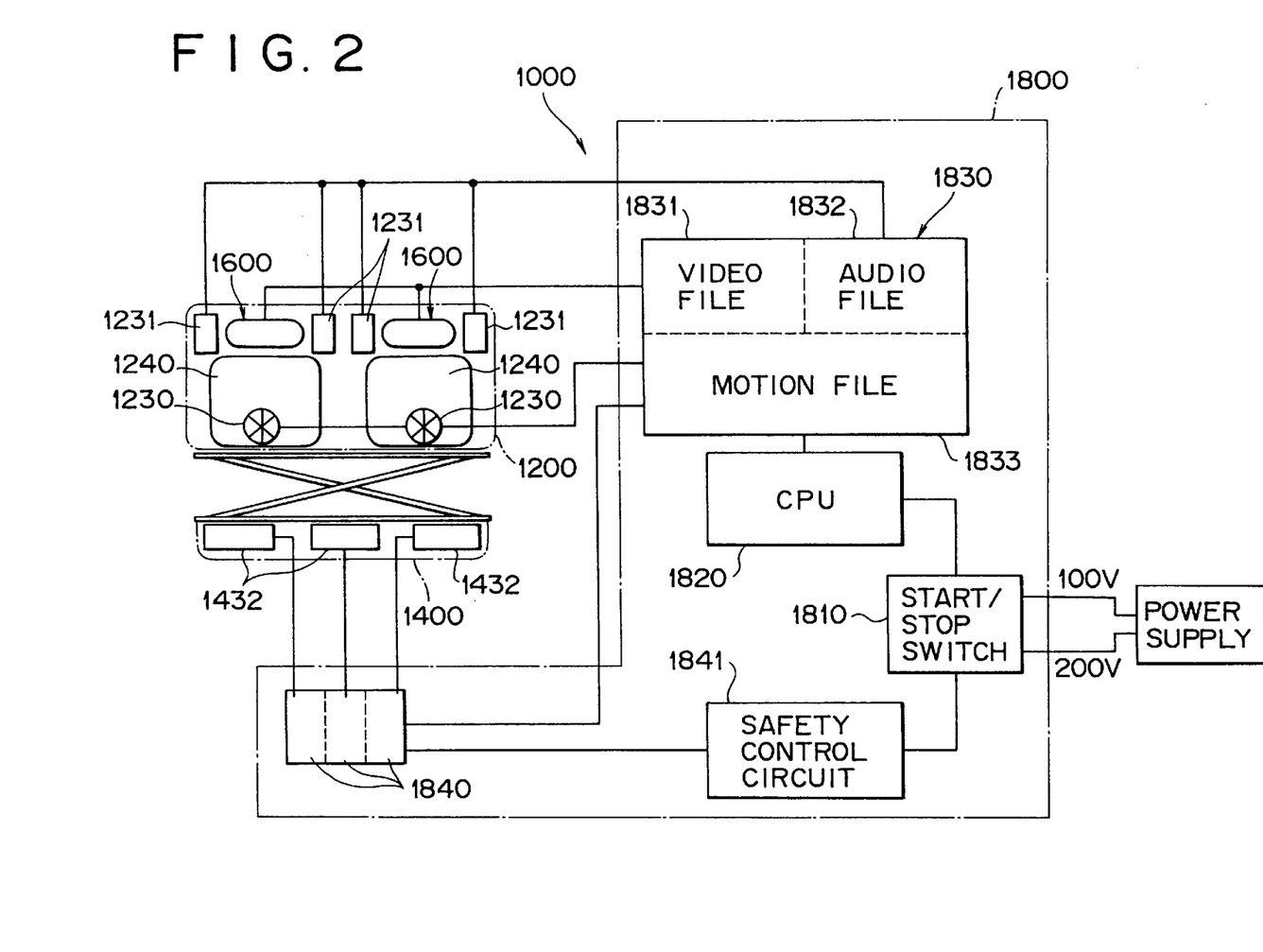
FIG. 2 is a structural view showing the general system for the bodily sensation simulation apparatus of FIG. 1.

FIG. 1 is a schematic perspective view showing an example of the outer shape of a bodily sensation simulation apparatus loaded with a rocking device according to an embodiment of the present invention, and FIG. 2 is a structural view showing the general system.

This bodily sensation simulation apparatus 1000 comprises: a body 1200; a rocking device 1400; a visual sensation device 1600; a control device 1800; and the like in such a manner that the control device 1800 projects a three-dimensional image onto the visual sensation device 1600, and at the same time, causes the rocking device 1400 to operate in correspondence with the movement of the three-dimensional image to rock the body 1200, whereby the user boarding on the body 1200 is caused to bodily sense simulation of a three-dimensional operation based on the movement of the three-dimensional image.

The body 1200 is structured by integrally molding a front body 1210 and a rear body 1220 using fiber-reinforced plastic material, metallic material or the like, and a space portion 1201 and a floor surface 1202, which are used for the user to alight and board, are formed between the front body 1210 and the rear body 1220.

The front body 1210 is formed in a dome shape which juts out forward, and cushioning members 1211 and 1212 are mounted to the upper and lower portions thereof. On both sides of the lower portion of the upper cushioning member 1211, two fans 1230 and 1231 are mounted toward the rear body 1220.

In the rear body 1220, there are provided two each of seats 1240, lock arms 1260, head-rests 1280, and the like.

Two seats and 1240 are provided side by side, and are structured to make it possible for the users to sit in a comparatively relaxed state. Within a scooped-out portion 1241*a* provided substantially in the center of the seat back portion 1241 of at least one of the seats 1240, there is housed a spare seat 1242.

This spare seat 1242 is formed in such a manner that a seat back portion 1242*a* and a sit-down portion 1242*b* are shaped substantially like a letter L, and a joint 1242*c* between the seat back portion 1242*a* and the sit-down portion 1242*b* is supported so as to be able to rotate 90° at the lower end of the scooped-out portion 1241*a*.

If the user is tall, the sit-down portion 1242*b* of the spare seat 1242 is housed in the scooped-out portion 1241*a* to set the seat back portion 1242*a* of the spare seat 1242 in a state in which it is housed within the rear body 1220 behind the seat back portion 1241 of the seat 1240. If when the user is short, the sit-down portion 1242*b* of the spare seat 1242 is drawn out from the scooped-out portion 1241*a* to set the seat back portion 1242*a* of the spare seat 1242 in a state in which it is housed within the scooped-out portion 1241*a*, whereby the seat is capable of easily coping with the user's height irrespective of it.

A lock arm 1260 is provided for each seat 1240 and is means for fixing by pressing the user who is in a sitting down state on the seat 1240 or the spare seat 1242.

Figure 3:
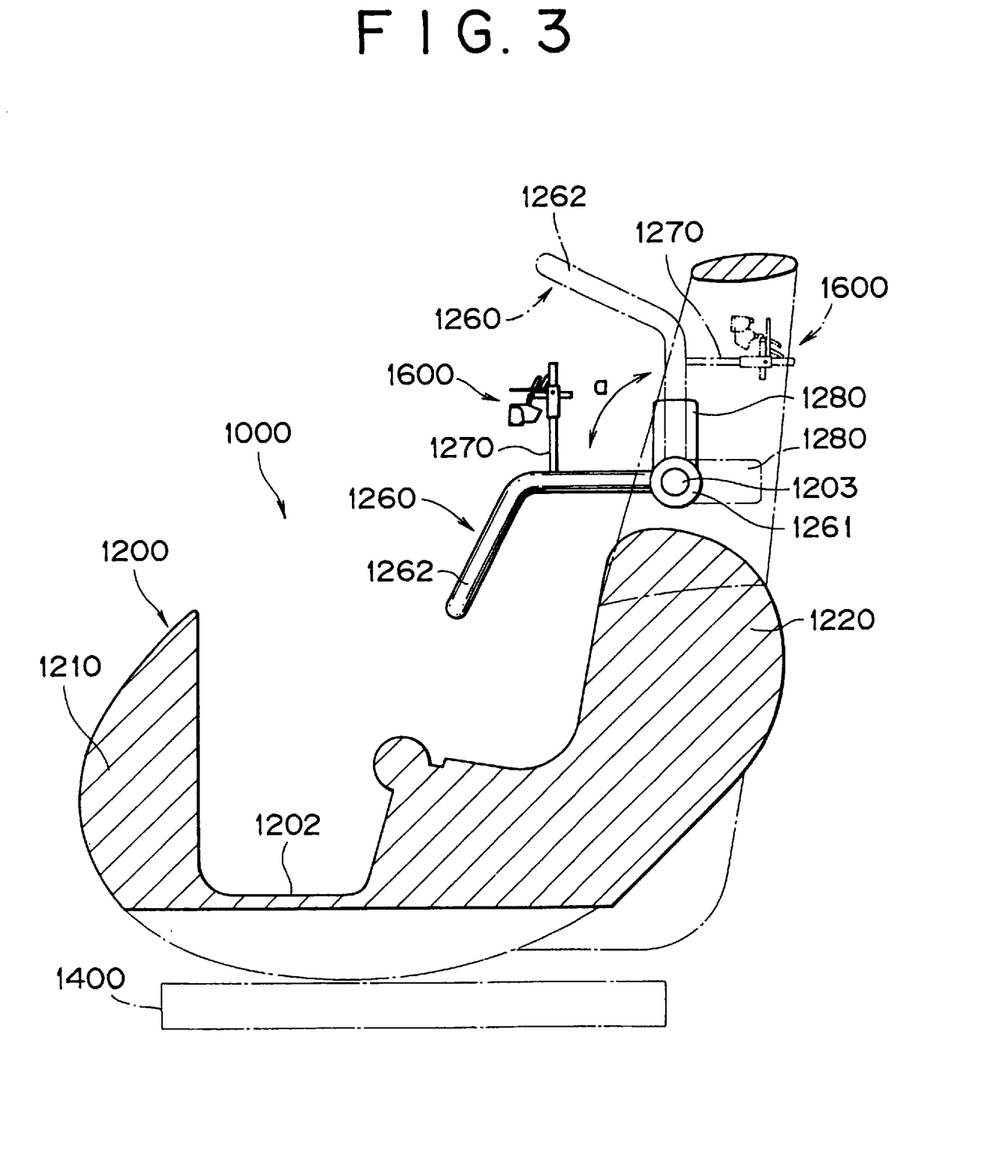
FIG. 3 is a partial side cross-sectional view showing the detail of a lock arm in the bodily sensation simulation apparatus of FIG. 1.
Figure 4:
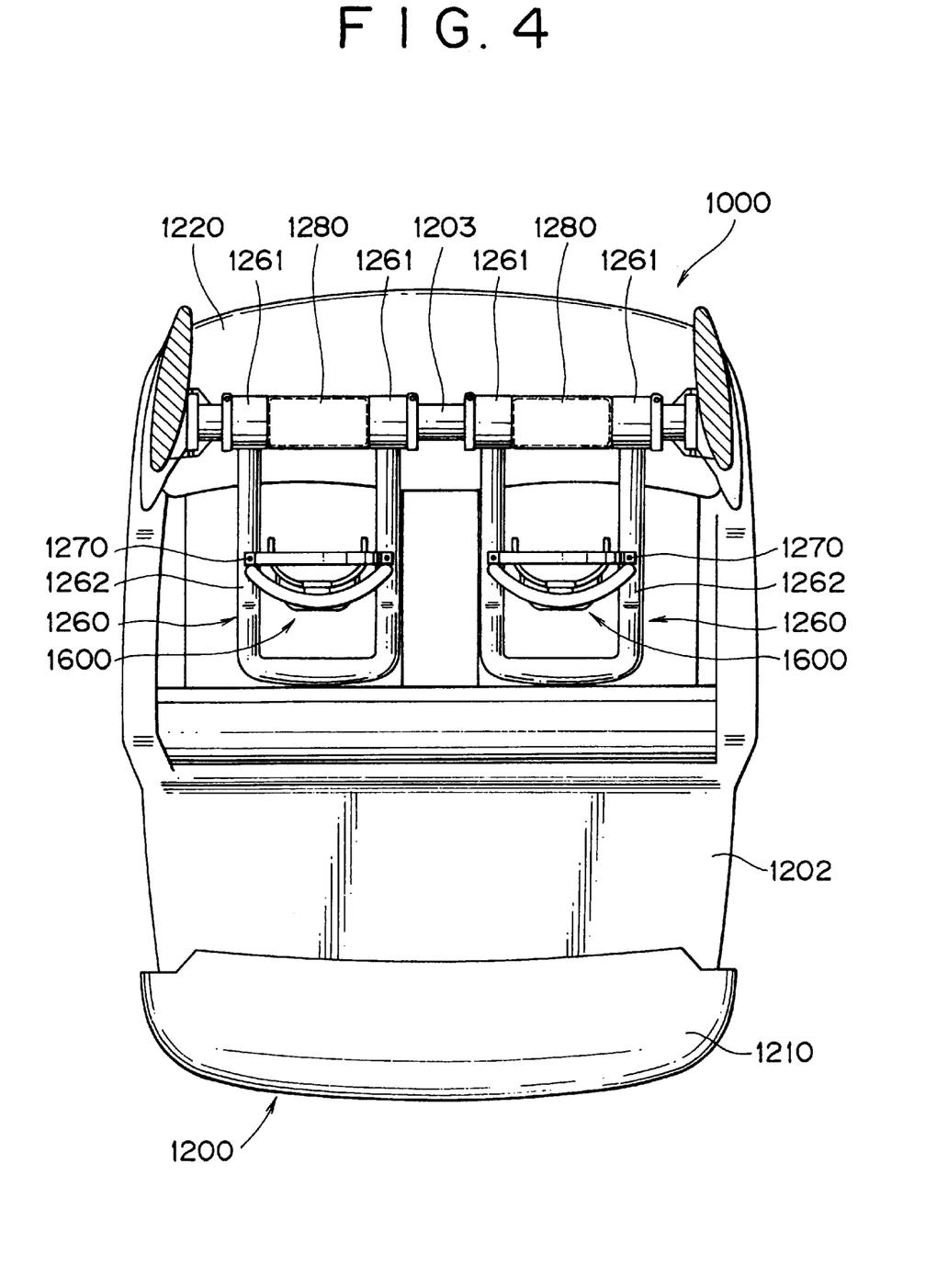
FIG. 4 is a partial plan cross-sectional view showing the detail of a lock arm in the bodily sensation simulation apparatus of FIG. 1.

The lock arm 1260 is, as shown in FIGS. 3 and 4, a rod made of metal, whose surface is covered with cushioning material, and is formed into a substantially L-letter shape as viewed from the horizontal direction, and into a substantially U-letter shape as viewed from the vertical direction. Both open ends (coupling ends) 1261, 1261 of the lock arm 1260 are rotatably coupled to a coupling rod 1203 stretched over the rear body 1220 along the upper portion of the seat back portion 1241 of the seat 1240 in a direction indicated by an arrow "a" in the figure.

With such structure, the user sits on the seat 1240 or the spare seat 1242 with the lock arm 1260 in an upwardly-sprung state and for example, the user pulls down an operating end 1262 of the lock arm 1260 in one hand or both hands, whereby the user's head is inserted within the U-shaped portion of the operating end 1262 of the lock arm 1260, and the user's trunk (shoulders to stomach) is held with the L-shaped and U-shaped portions of the operating end 1262 of the lock arm 1260. Therefore, the user can be fixed in a state in which the user sits on the seat 1240 or the spare seat 1242. In this respect, the lock arm 1260 can also be structured so as to move up or down manually by a manager or automatically.

The head-rest 1280 is structured to make it possible to support the user's head when the user sits on the seat 1240 or the spare seat 1242 and is fixed by the lock arm 1260.

The head-rest 1280 is integrally coupled so as to be able to rotate with the rotation of the lock arm 1260 between the coupling ends 1261 of the lock arm 1260 in an upper portion of the seat back portion 1241 of the seat 1240.

On both sides of the head-rest 1280, there are mounted a pair of speakers 1231 which are capable of giving off sound images, i.e., a sound which is recognized in azimuth and distance in spaces, correspondingly to the user's both ears respectively.

The rocking device 1400 is provided with three driving means, and is a mechanism portion for three-dimensionally operating by only controlling motors 1432 provided for each driving means to thereby rock the body 1200, that is, pitch, roll and heave the body.

The visual sensation device 1600 is structured into a goggles type in which a three-dimensional image is projected inside, and is movably mounted to a substantially U-shaped mounting arm 1270, which is mounted at some midpoint of the operating end 1262 of the lock arm 1260. In other words, the visual sensation device 1600 is disposed so that the user can peep in and see the three-dimensional image projected inside when the user sits on the seat 1240 or the spare seat 1242 and is fixed by the lock arm 1260.

The control device 1800 comprises: a start/stop switch 1810 for starting/stopping the control device 1800; a CPU 1820; a memory portion 1830 Such as a hard disk (HD) and a digital versatile disk (DVD); a motor control circuit 1840 equipped with a safety control circuit 1841 for controlling three motors 1432 respectively; and the like.

In the memory portion 1830, t here are stored a video file 1831 for causing the visual sensation device 1600 to project the three-dimensional view, an audio file 1832 for giving off a sound image through speakers 1231 and a motion file 1833 for rocking the rocking device 1400 three-dimensionally and blowing natural air flow from fans 1230.

More specifically, the video file 1831 is structured with data on photographs taken from life which have been photographed by alternately switching two photographing devices arranged in parallel at a spacing (for example, 65 mm ) slightly narrower than a spacing between both human eyes every 1/60 second (for 1 field).

The audio file 1832 is structured with data on sound images obtained by adding time differences and differences in intensity level on the basis of the data on a motion file 1833, to audio signals taken from two microphones.

The motion file 1833 is structured with data obtained by converting data obtained by measuring movements in six axial directions in total: directions of three axes intersecting at right angles and directions around each axis by, for example, a gyro sensor into directions of rotation, amounts of rotation, rotating speeds and the like for the three motors 1432, and data converted into the amounts of rotation, rotating speeds, and the like for the fans 1230.

The video and audio files 1831, 1832 are compressed in the method of, for example, MPEG2 (Motion Picture Experts Group 2) and stored, while the motion file 1833 is stored in, for example, MIDI (Musical Instrument Digital Interface) FORMAT.

Next, a rocking device 1400 according to an embodiment of the present invention will be described further in detail.

Figure 5:
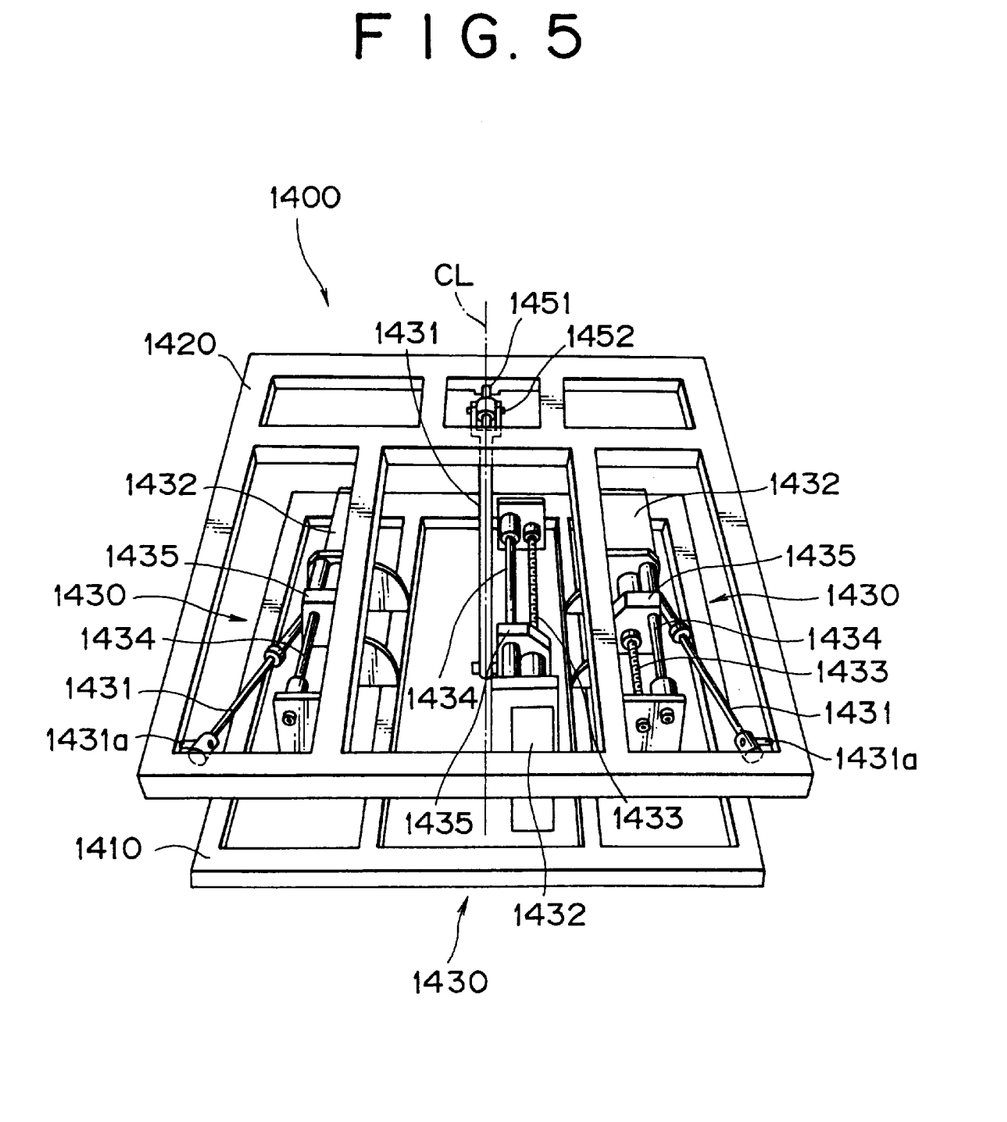
FIG. 5 is a first perspective view showing the detail of a rocking device in the bodily sensation simulation apparatus of FIG. 1.
Figure 6:
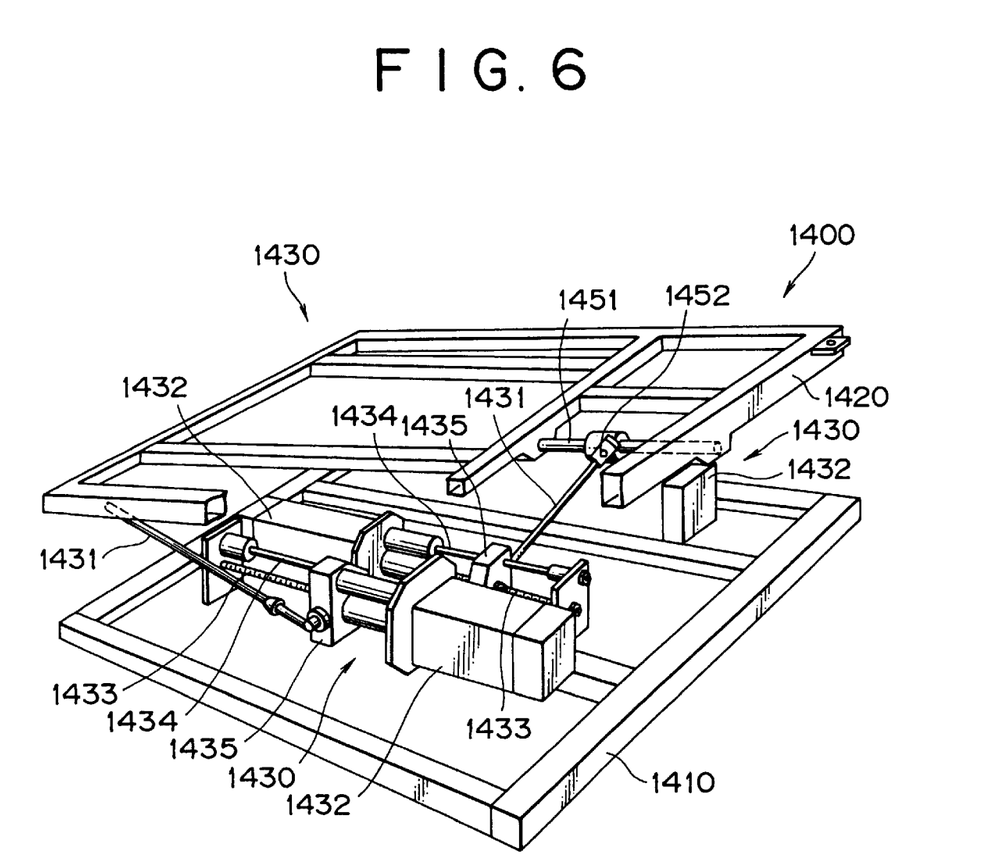
FIG. 6 is a second perspective view showing the detail of the rocking device of FIG. 1.
Figure 7:
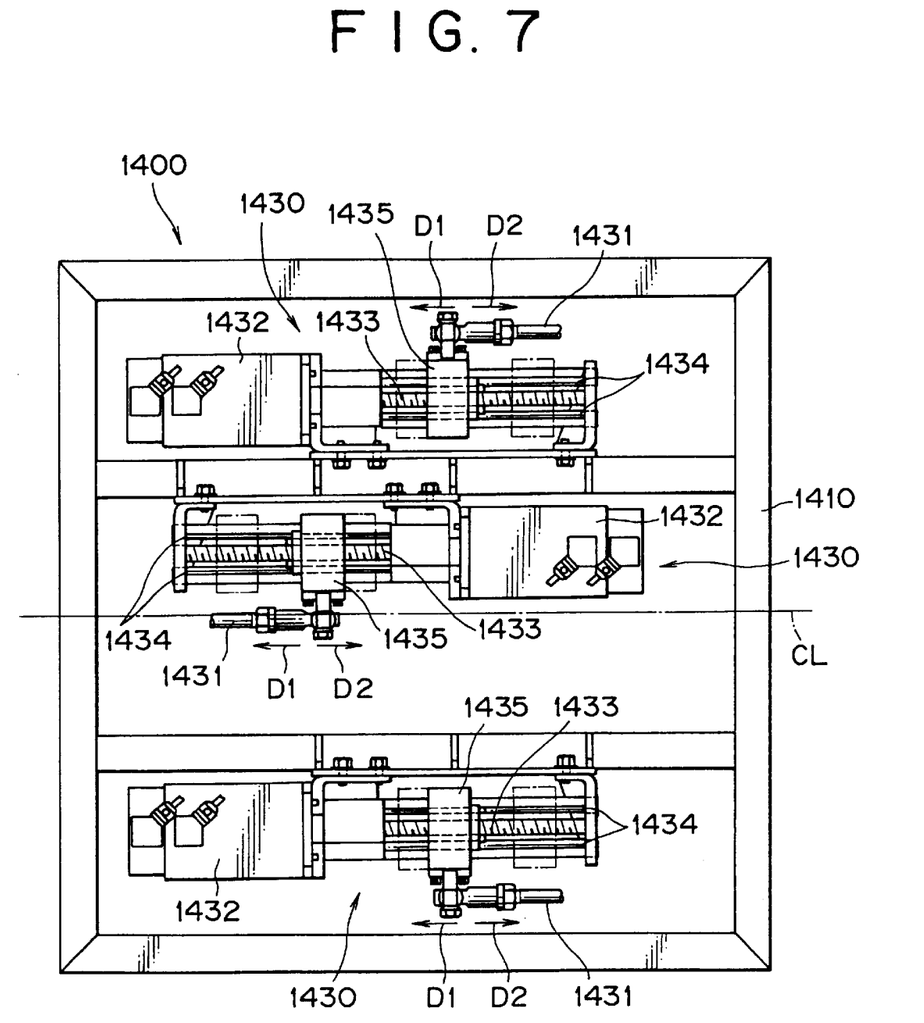
FIG. 7 is a plan view showing the layout of driving means for the rocking device of FIG. 1.

FIGS. 5 and 6 are a perspective view when the general structure of the rocking device 1400 is viewed from the rear, and a perspective view when it is viewed from the front obliquely respectively, and FIG. 7 is a plan view showing the layout of the driving means for the rocking device 1400.

This rocking device 1400 comprises: a base (chassis) 1410; a motion table (rocking object) 1420; three driving means 1430; and the like.

The base 1410 is a rectangular or square frame, and three driving means 1430 are disposed on the base 1410 in parallel with the center line CL thereof.

The motion table 1420 is the same rectangular or square frame as the base 1410, and the central portion of the lower portion of the motion table 1420 on one side is rotatably coupled to an arm (first arm) 1431 provided for one driving means (hereinafter, referred to as front driving means) 1430 arranged on the base 1410 substantially at the center thereof. The both end portions of the lower portion of the motion table 1420 on the other side are rotatably coupled to arms (first arms) 1431 provided for two driving means (hereinafter, referred to as rear driving means) 1430 arranged on the base 1410 on both sides thereof.

Figure 8:
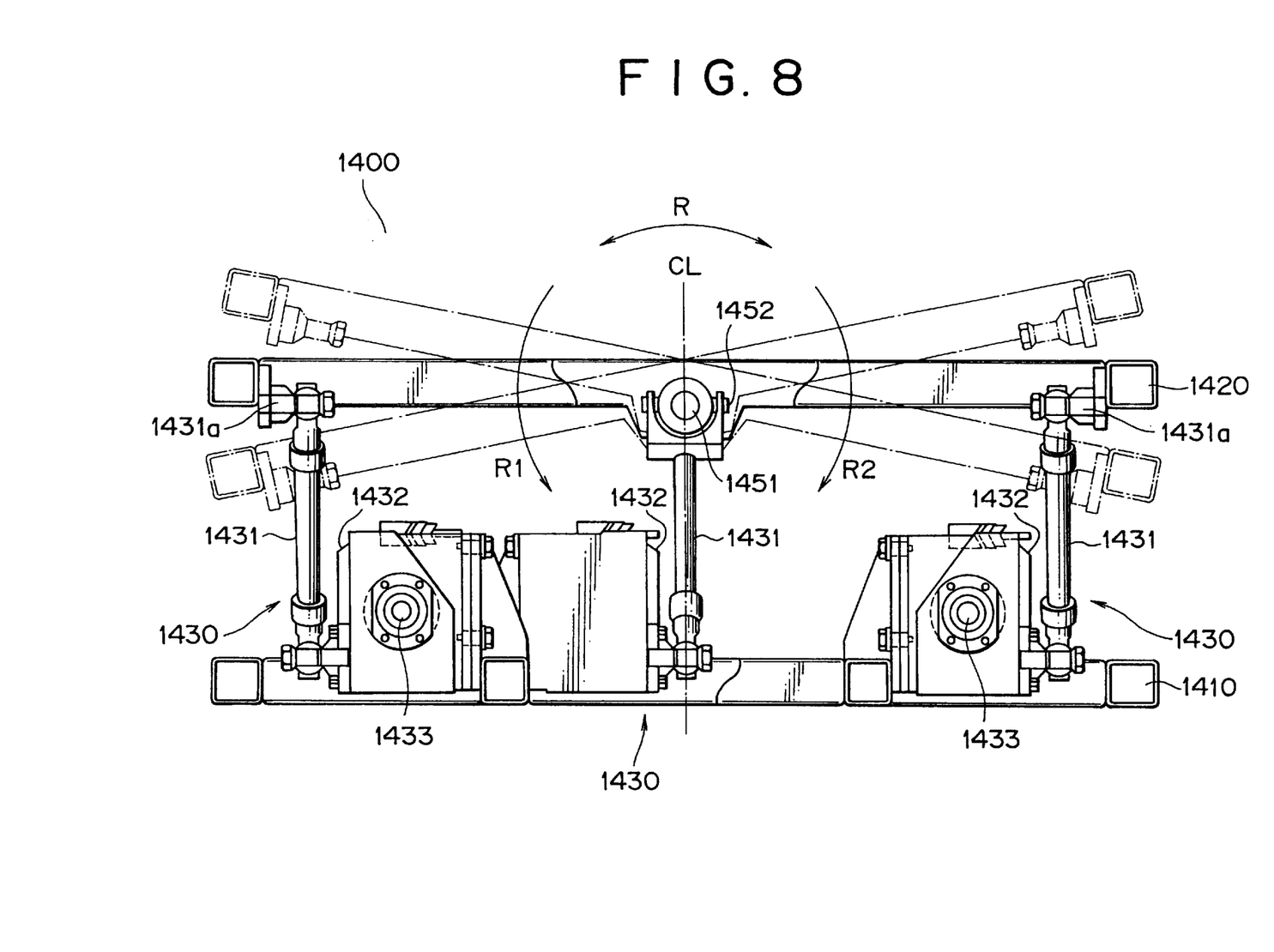
FIG. 8 is a first side view showing the general structure of the rocking device of FIG. 7.

More specifically, the central portion of the lower portion of the motion table 1420 on one side is coupled to one end of the arm 1431 provided for the front driving means 1430 through a first pin 1451 parallel with the center line CL and a second pin 1452 orthogonal to the first pin 1451. The motion table 1420 is, as shown in FIG. 8, rotatably supported round the first pin 1451 in a direction indicated by R1 or R2, and is, as shown in FIG. 9, rotatably supported round the second pin 1452 in a direction indicated by P1 or P2.

Figure 9:
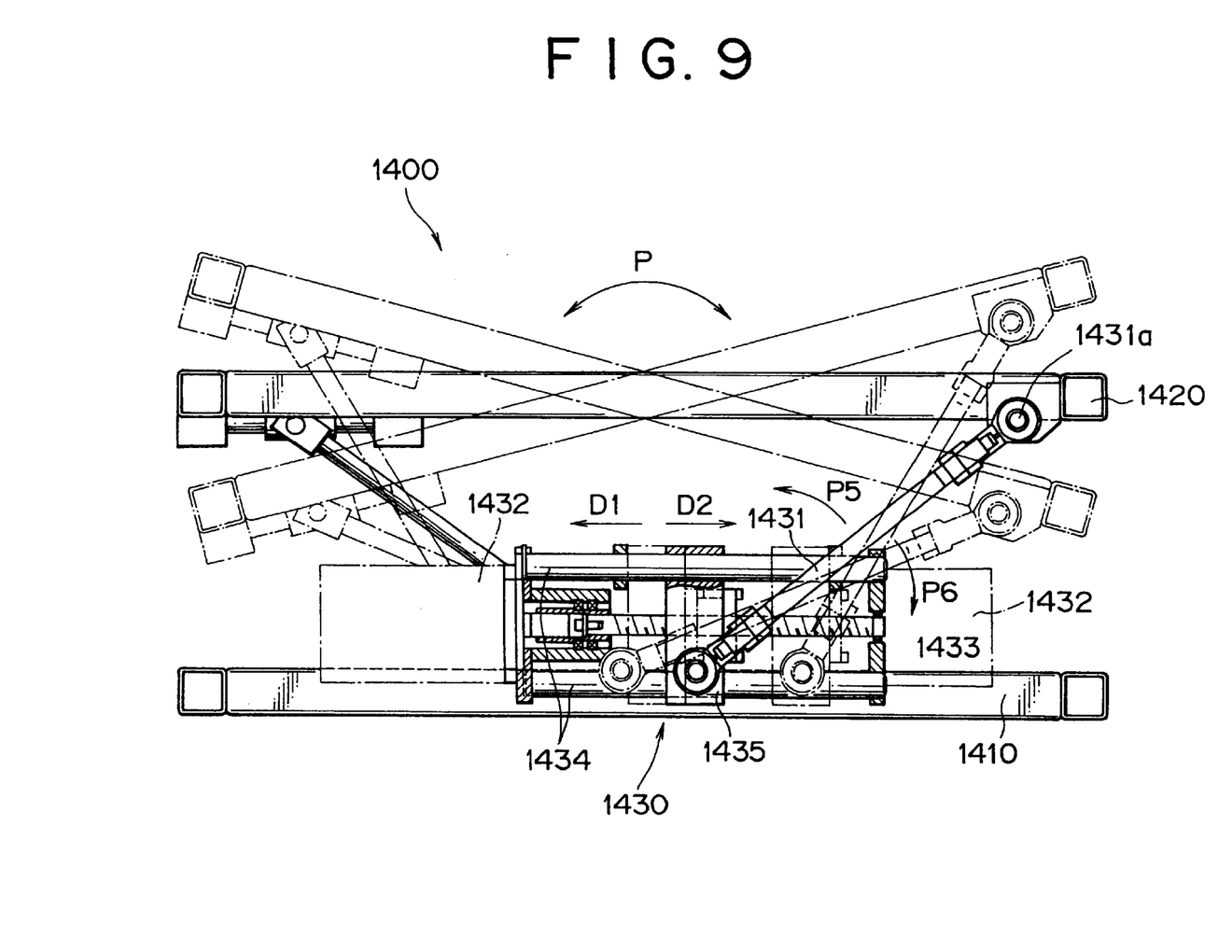
FIG. 9 is a second side view showing the general structure of the rocking device of FIG. 7.

Furthermore, each of the both end portions of the lower portion of the motion table 1420 on the other side is coupled to one end of the arm 1431 provided for each rear driving means 1430 through a pin 1431a respectively, and the motion table 1420 is, as shown in FIG. 9, rotatably supported round the pin 1431a in a direction indicated by P5 or P6. Thus, on the motion table 1420, the front body 1210 side of the body 1200 is detachably fixed to face the front driving means 1430 side, and the rear body 1220 side is detachably fixed to face the rear driving means 1430 side.

Figure 12:
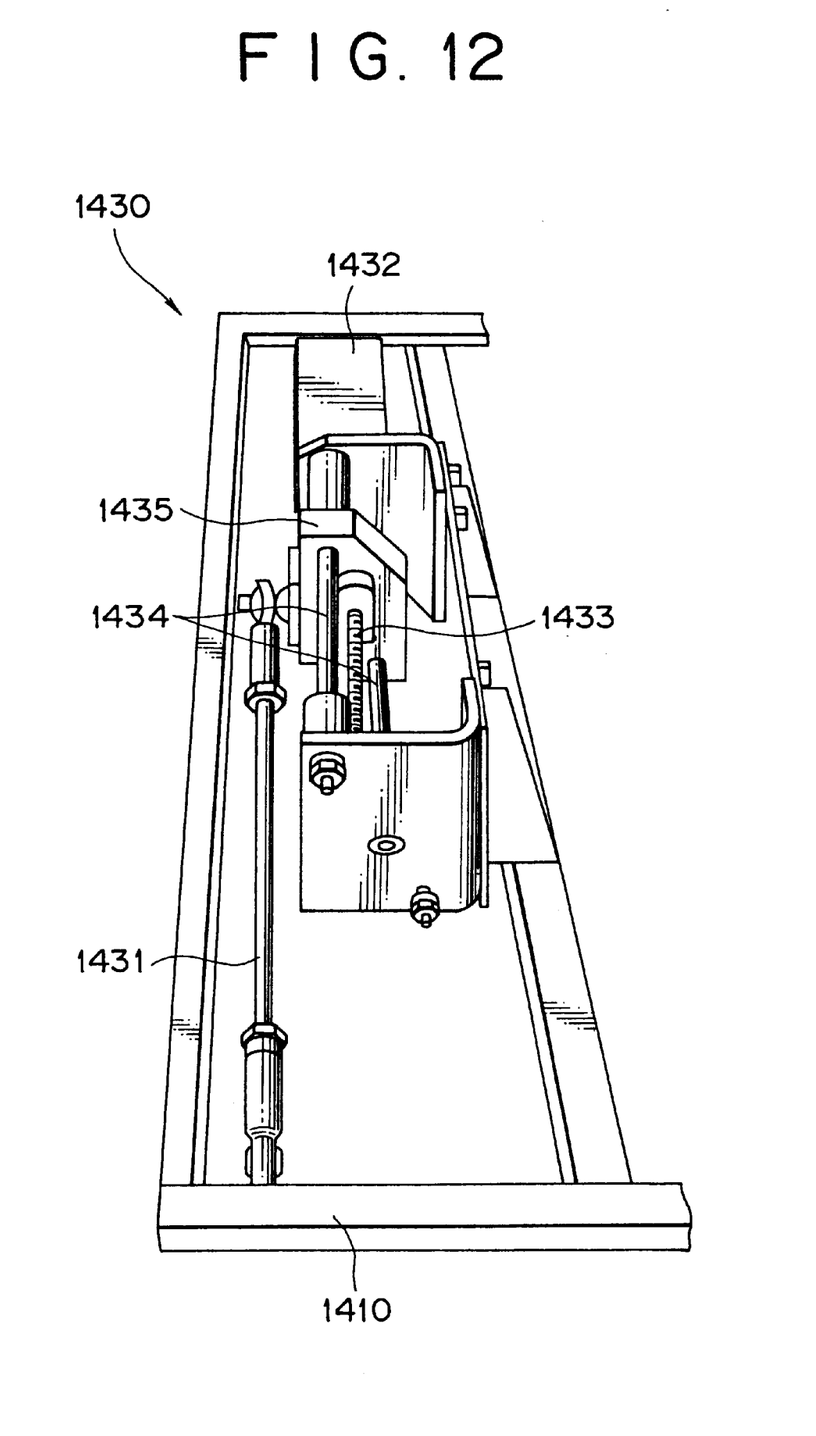
FIG. 12 is a perspective view showing the driving means for the rocking device of FIG. 7.
Figure 13:
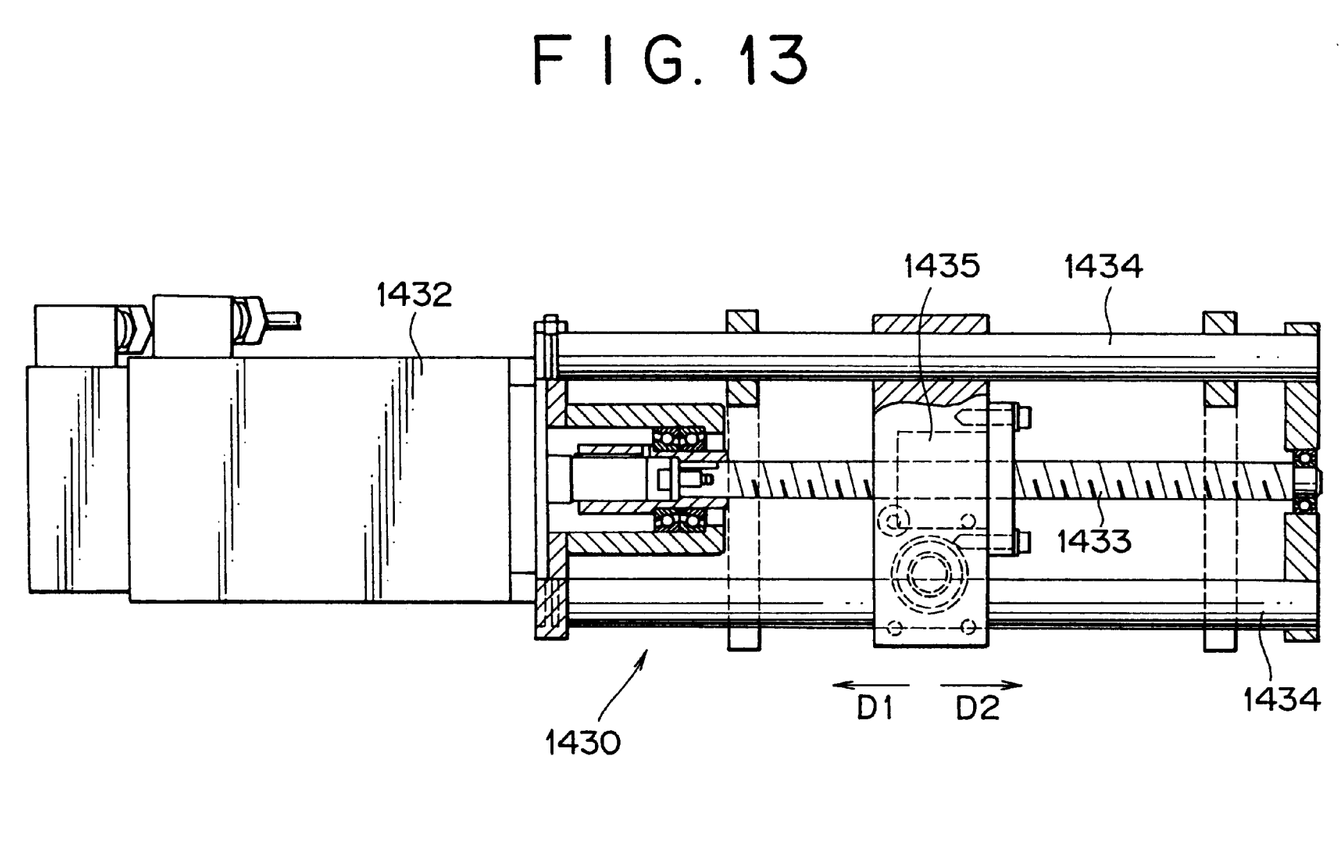
FIG. 13 is a side view showing the driving means for the rocking device of FIG. 7.

Each driving means 1430 comprises: as shown in detail in FIGS. 12 and 13, an arm 1431; a motor (AC motor) 1432; a feed screw 1433; two guide bars 1434; a slider 1435; and the like.

To the shaft for the motor 1432, the feed screw 1433 is rotatably mounted, to the feed screw 1433, and guide bars 1434 arranged in parallel with the feed screw 1433, a slider 1435 is linearly movably mounted, and to the slider 1435, the other end of the arm 1431 is rotatably mounted in synchronization with the linear movement of the slider 1435.

More specifically, the rocking device is structured such that the motor 1432 can be driven to rotate the feed screw 1433 to thereby linearly move the slider 1435 along two guide bars 1434 in a direction indicated by an arrow D1 or D2 shown in FIG. 13, and (at the same time, to rotate the arm 1431 in a direction indicated by an arrow P5 or P6 shown in FIG. 9.

Figure 14:
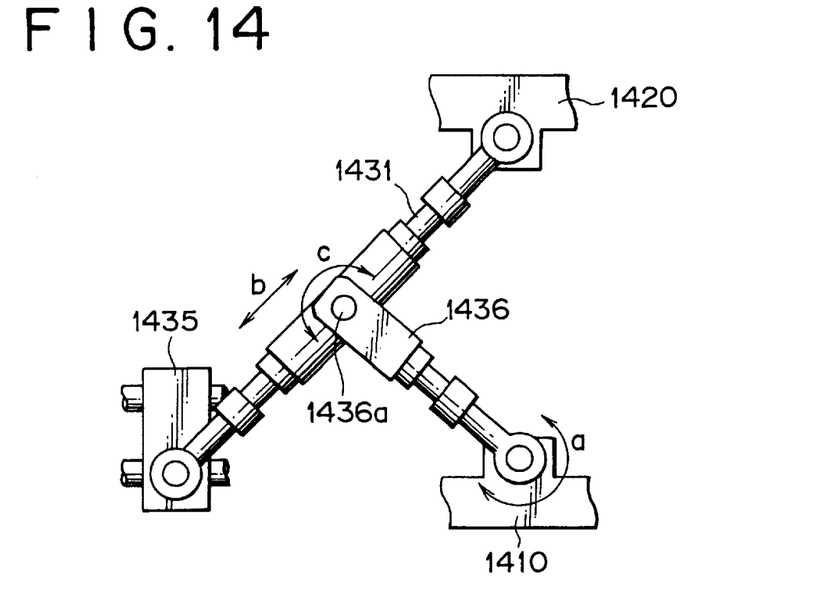
FIG. 14 is a side view showing another embodiment of an essential portion of the driving means for the rocking device of FIG. 7.
Figure 15:
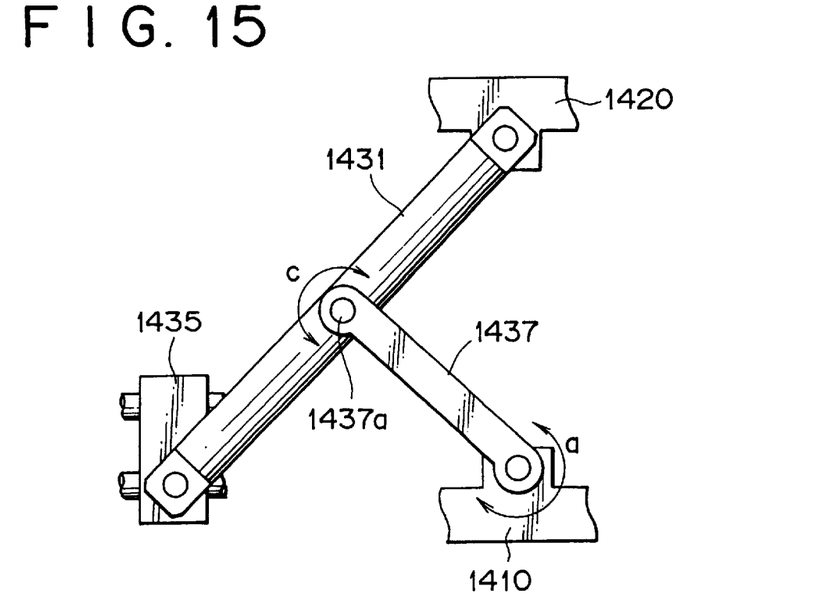
FIG. 15 is a side view showing further another embodiment of the essential portion of the driving means for the rocking device of FIG. 7.

In this respect, an auxiliary arm (second arm) 1436 may be structured, as shown in FIG. 14, such that one end thereof is rotatably mounted to the base 1410 in a direction indicated by an arrow "a" shown in the figure, and the other end is mounted so as to be slidable in the axial direction b of the arm 1431 through, for example, a thrust bearing and to be rotatable round a pin 1436a in a direction indicated by an arrow c shown in the figure, or an auxiliary arm (second arm) 1437 may be structured, as shown in FIG. 15, such that one end thereof is rotatably mounted to the base 1410 in a direction indicated by an arrow "a" shown in the figure, and the other end is rotatably mounted to the arm 1431 at, for example, its axial central portion round a pin 1437a in a direction indicated by an arrow "c" shown in the figure. According to such structure, it is possible to increase the rigidity of the arm 1431 to thereby restrain a shake for making the movement of the arm 1431 smoother.

According to a rocking device 1400 structured as described above, each arm 1431, of the rear driving means 1430 is caused to rotate in the reverse direction respectively with the front driving means 1430 left stopped as shown in FIG. 8, whereby the motion table 1420 can be rolled round the first pin 1451 in a direction indicated by an arrow R shown in the figure with respect to the base 1410.

Also, the arm 1431 of the front driving means 1430 and each arm 1431 of the rear driving means 1430 are caused to rotate in the reverse direction respectively as shown in FIG. 9, whereby the motion table 1420 can be caused to pitch with its center as the center of rotation in a direction indicated by an arrow P shown in the figure with respect to the base 1410.

Figure 10:
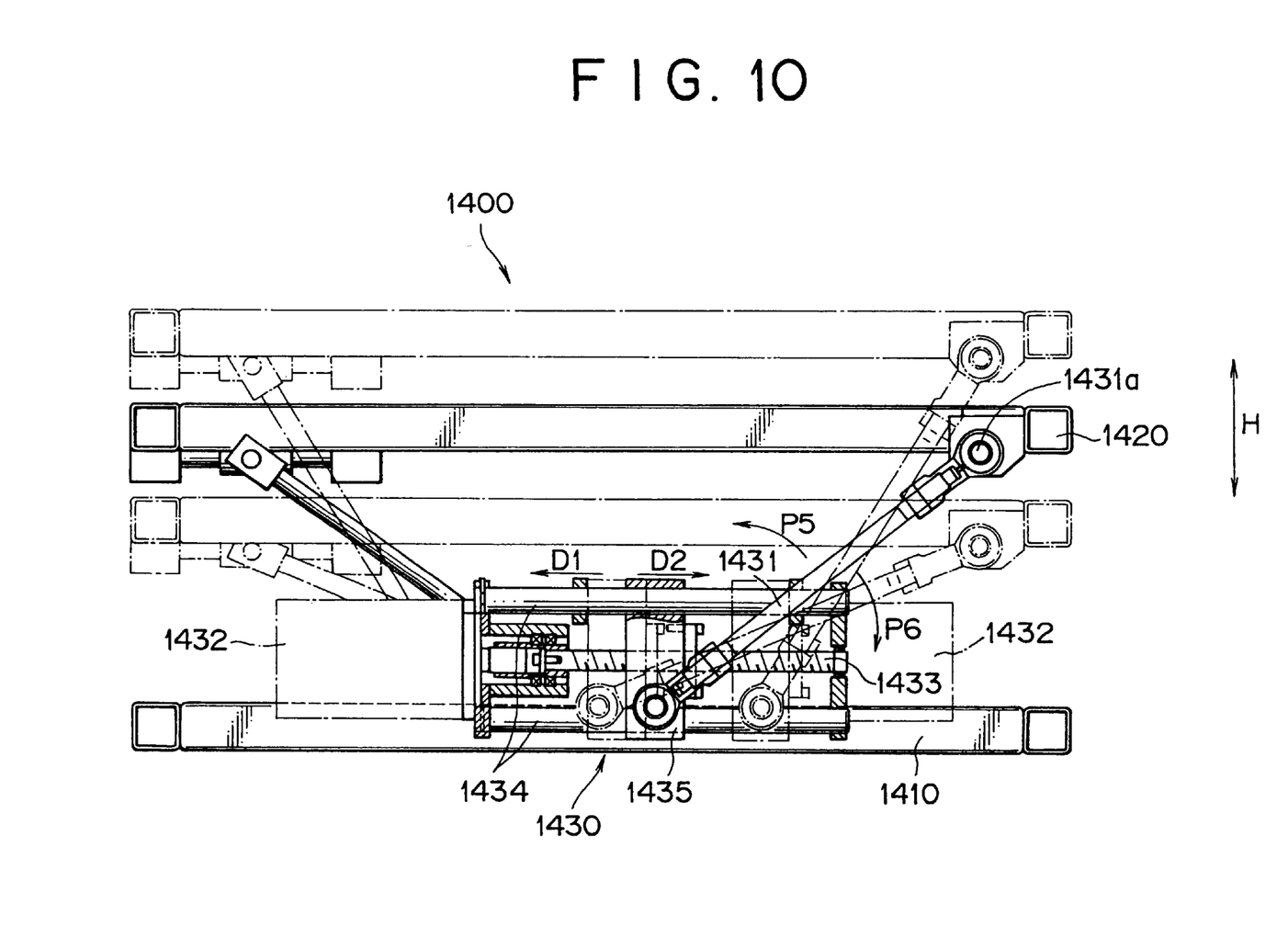
FIG. 10 is a third side view showing the general structure of the rocking device of FIG. 7.

Furthermore, each arm 1431 of the front driving means 1430 and the rear driving means 1430 is caused to rotate in the same direction as shown in FIG. 10, whereby the motion table 1420 can be heaved in a direction indicated by an arrow H shown in the figure with respect to the base 1410.

Figure 11:
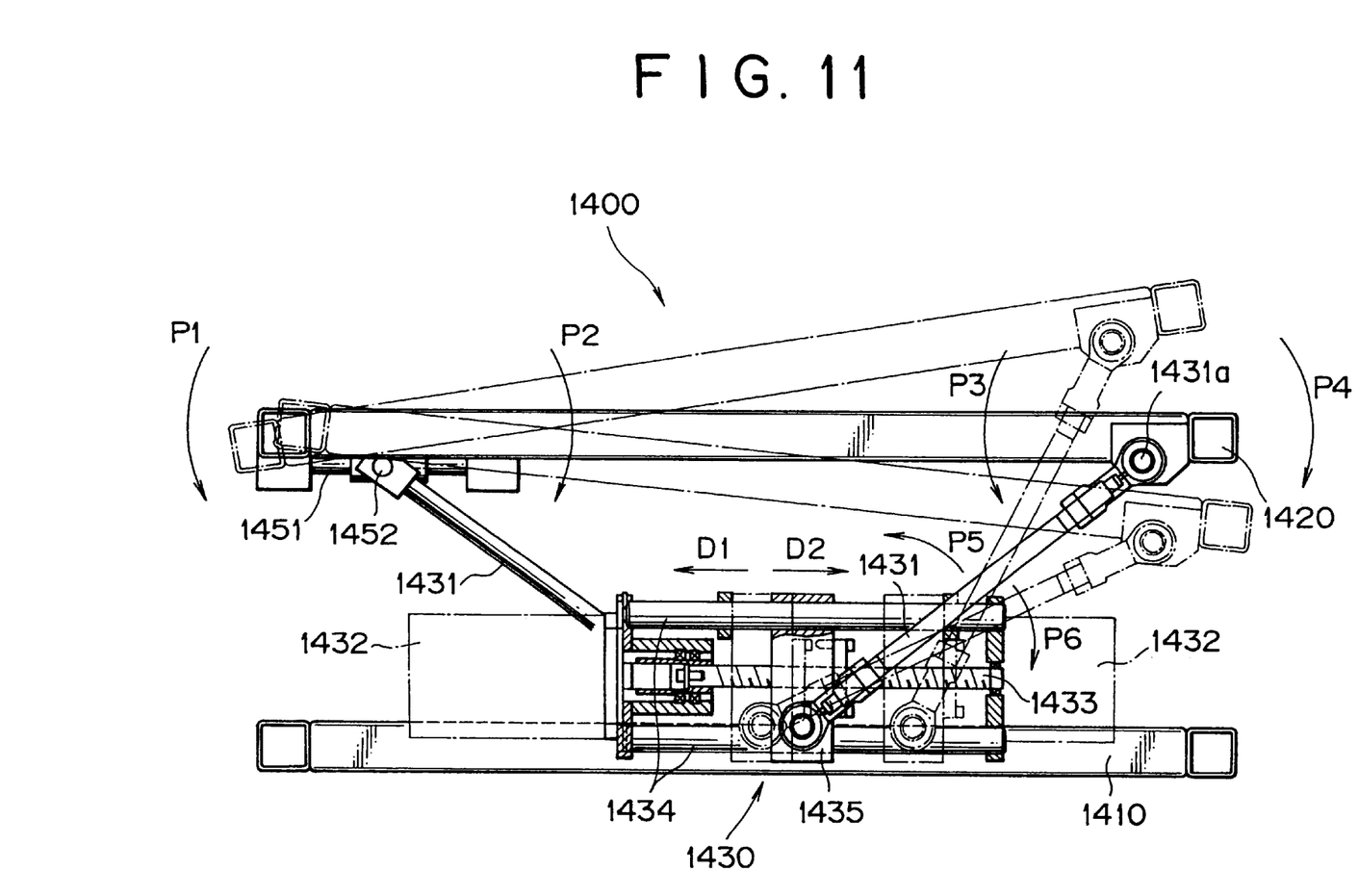
FIG. 11 is a fourth side view showing the general structure of the rocking device of FIG. 7.

Moreover, each arm 1431 of the rear driving means 1430 is caused to rotate in the same direction respectively with the front driving means 1430 left stopped as shown in FIG. 11, or the arm 1431 of the front driving means 1430 is caused to rotate with the rear driving means 1430 left stopped, whereby the motion table 1420 can be rolled with respect to the base 1410 with the second pin 1452 as the center of rotation or with the pin 1431a as the center of rotation.

By appropriately operating each arm 1431 as described above, the body 1200 fixed on the motion table 1420 can be operated threedimensionally freely.

Next, the description will be made of an example of use and an example of operation of the bodily sensation simulation apparatus 1000 described above.

When the bodily sensation simulation apparatus 1000 is at rest, the motion table 1420 of the rocking device 1400 is in a substantially horizontally held state, and the lock arm 1260 is in an upwardly-sprung state. In this state, the user sets foot on the floor surface 1202 to enter the space 1201, and sits on the seat 1240.

A height between the floor on which the bodily sensation simulation apparatus 1000 is placed and the floor surface 1202 of the body 1200 is only a sum of the height of the rocking device 1400 and the height of the floor surface 1202, and since the height is comparatively low, the user can easily ride on the bodily sensation simulation apparatus 1000.

Also, since there are two seats 1240, one or two users can ride on the bodily sensation simulation apparatus 1000. If the user is short, the user can cope with it immediately by drawing out the spare seat 1242.

When the user sits on the seat 1240 or the spare seat 1242, the user pulls down an operating end 1262 of the lock arm 1260, for example, in one hand or both hands, inserts the user's head within the U-shaped portion of the operating end 1262 of the lock arm 1260, and holds the user's trunk (shoulders to stomach) with the L-shaped and U-shaped portions of the operating end 1262 of the lock arm 1260.

In order for the user to be able to view an image projected within the visual sensation device 1600 in the best position, the visual sensation device 1600 is adjusted to a height position of the both eyes by vertically moving it, is adjusted to an angle easy to view by rocking it around the horizontal axis, and is adjusted to a position in substantially contact with the forehead by moving it horizontally.

Next, the manager or the user presses a start/stop switch 1810 provided for a control device 1800 to start a CPU 1820 of the control device 1800. Then, the CPU1820 causes the visual sensation device 1600 to project a three-dimensional image, and causes speakers 1231 to give off a sound image on the basis of the content of video and audio files 1831, 1832 stored in a memory portion 1830. Thus, on the basis of the content of a motion file 1833 which has synchronized them, a motor control circuit 1840 is controlled to operate the rocking device 1400 three-dimensionally and to drive the fans 1230.

More specifically, the data of the video file 1831 is divided into portion of data every ⅟₆₀ second (for 1 field) which have been photographed with two photographing devices in the visual sensation device 1600. Thus, it is made into two virtual images enlarged corresponding to each portion of data to be projected onto each retina of the user's both eyes respectively.

Therefore, the user actually sees two different, enlarged virtual images having parallax with the right and left eyes respectively, but the user recognizes them as a three-dimensional image. Thus, the user can see an enlarged, powerful and sharp three-dimensional image.

The data of the audio file 1832 is given off from the speakers 1231 as a sound image. Since this causes the user to recognize the sound in azimuth and distance in spaces, the user can hear sound to produce greater presence.

On the other hand, since the data of the motion file 1833 has been converted into data such as directions of rotation, amounts of rotation, and rotating speeds of the three motors 1432, and data such as amounts of rotation and rotating speeds of the fans 1230, the driving means 1430 of the rocking device 1400 and the fans 1230 are appropriately controlled on the basis of each data.

For example, when the motor 1432 for the front driving means 1430 is stopped and two motors 1432 for the rear driving means 1430 are rotated in synchronization with each other and in the reverse direction respectively, the two feed screws 1433 rotate in the reverse direction respectively.

In this way, for example, two sliders 1433 move in synchronization with each other and in a D1 direction and in a D2 direction respectively, and therefore, two arms 1431 rotate in a P6 direction and in a P5 direction respectively to cause the motion table 1420 to incline, for example, about −12° from the horizontal line with the first pin 1451 as the center of rotation.

When the two sliders 1435 move in synchronization with each other and in a D2 direction and in a D1 direction respectively, the two arms 1431 rotate in a P5 direction and in a P6 direction respectively to cause the motion table 1420 to incline, for example, about +12° from the horizontal line with the first pin 1451 as the center of rotation.

The foregoing control causes the body 1200 to rock (roll) in the R direction shown in FIG. 8.

For example, when the motor 1432 for the front driving means 1430 and the two motors 1432 for the rear driving means 1430 are rotated in synchronization with each other and in the reverse direction respectively, the three feed screws 1433 rotate all in the same direction with each other.

Thus, for example, the three sliders 1435 move all in the D1 direction in synchronization with one another, and therefore, the three arms 1431 rotate all in the P6 direction so that the motion table 1420 inclines, for example, about −15° from the horizontal line with its center as the center of rotation.

When the three sliders 1435 move all in the D2 direction in synchronization with one another on the contrary, the three arms 1431 rotate all in the P5 direction so that the motion table 1420 inclines, for example, about +15° from the horizontal line with its center as the center of rotation.

The foregoing control causes the body 1200 to rock (pitch) in the P direction shown in FIG. 9.

For example, when the three motors 1432 for the front driving means 1430 and the rear driving means 1430 rotate in synchronization with one another and all in the same direction, the feed screw for the front driving means 1430 and the two feed screws 1433 for the rear driving means 1430 rotate in the reverse direction respectively.

Thus, for example, the slider 1435 for the front driving means 1430 and the two sliders 1435 for the rear driving means 1430 move in synchronization with one another, and in the D2 direction and in the D1 direction respectively, and therefore, the arm 1431 for the front driving means 1430 and the two arms 1431 for the rear driving means 1430 rotate in the P5 direction and in the P6 direction respectively so that the motion table 1420 moves up by, for example, about +100 mm from the horizontal position in parallel.

When the slider 1435 for the front driving means 1430 and two sliders 1435 for the rear driving means 1430 move in synchronization with one another, and in the D1 direction and in the D2 direction respectively on the contrary, the arm 1431 for the front driving means 1430 and the two arms 1431 for the rear driving means 1430 rotate in the P6 direction and in the P5 direction respectively so that the motion table 1420 lowers, for example, about −100 mm in parallel from the horizontal position.

The foregoing control causes the body 1200 to heave in the H direction shown in FIG. 10.

For example, when the motor 1432 for the front driving means 1430 stops and the two motors 1432 for the rear driving means 1430 rotate in synchronization with one another and all in the same direction, the two feed screws 1433 rotate both in the same direction.

In this way, for example, the two sliders 1435 move in synchronization with each other and both in the D1 direction, and therefore, the two arms 1431 rotate both in the P6 direction so that the rear end portion of the motion table 1420 lowers, for example, about −6° from the horizontal line with the second pin 1452 as the center.

When the two sliders 1435 move in synchronization with each other and both in the D2 direction on the contrary, the two arms 1431 rotate both in the P5 direction so that the rear end portion of the motion table 1420 moves up, for example, about +9° from the horizontal line with the first pin 1451 as the center.

The foregoing control causes the body 1200 to rock (pitch) in the direction shown in FIG. 11.

The directions of rotation, amounts of rotation, and rotating speeds of the three motors 1432 are appropriately varied on the basis of the data of the motion file 1833 in this way and two types of rocking operations and the heaving operation are combined, whereby the body 1200 can be caused to perform complicated three-dimensional operations.

By the foregoing control, the user boarding on the bodily sensation simulation apparatus 1000 can hear a sound image simultaneously corresponding to a three-dimensional image projected on the visual sensation device 1600 through the speakers 1231, can experience three-dimensional operations simultaneously corresponding to the three-dimensional image on the body 1200 through the rocking device 1400, and further can receive wind simultaneously corresponding to the three-dimensional image through the fans 1230, thus making it possible for the user enjoy a realistic and to powerful pseudo-experience.

As described above, a rocking device 1400 according to the present embodiment is capable of performing complicated three-dimensional operations by rocking, that is, pitching, rolling and heaving the body 1200 only by three driving means 1430, and therefore, it is possible to make the structure of the rocking device 1400 compact, and to make the control programs and the like for the rocking device 1400 simple. Therefore, there is no need for large installation space and large-scale equipment. Unlike the conventional rocking device, it becomes possible to move the installation place quickly and easily, and to further greatly reduce various costs.

In this respect, in the above-described embodiment, the description has been made of a case where a bodily sensation simulation apparatus 1000 is loaded with a rocking device 1400, but the present invention is not limited thereto, and is applicable to game equipment installed in, for example, a game house or the like.

As described above, according to the present invention, it is possible to perform complicated operations with simple structure.

What is claimed is:

1. A rocking device for rocking a rocking object, comprising:
   only three supporting means for rotatably supporting said rocking object; and
   only three driving means for rocking said rocking object using said supporting means,
   each of said driving means being drivingly controlled to thereby roll, pitch and heave said rocking object.

2. A rocking device according to claim 1, wherein each of said supporting means comprises a first arm;
   a first end of a middle first arm is mounted to a middle driving means
   a second end of said middle first arm is mounted to a central portion of said rocking object;
   a first end of a left first arm is mounted to a left driving means;
   a second end of said left first arm is mounted to a left portion of said rocking object;
   a first end of a right first arm is mounted to a right driving means; and
   a second end of said right first arm is mounted to a right portion of said rocking object.

3. A rocking device according to claim 1, wherein each of said supporting means comprises a first arm and a second arm, a first end of each of said first arms is mounted to one of said driving means, a second end of each of said first arms is mounted to said rocking object, a first end of each of said second arms is mounted to one of said first arms and a second end of each of said second arms is mounted to a base portion of said rocking device.

4. A rocking device according to claim 3, wherein at least one of said second arms is mounted for rotation relative to one of said first arms.

5. A rocking device according to claim 4, wherein at least one of said second arms is mounted to slide along an axis of one of said first arms.

6. A rocking device according to claim 1, wherein each of said driving means has a motor and a slider, and said slider is driven in an axial direction by each motor of said driving means, whereby an end of said supporting means rotationally moves in a direction perpendicular to an axial direction.

7. A bodily sensation simulation apparatus for providing a pseudo-experience to a user, comprising:
   a rocking object for supporting said user;
   a rocking device for rocking said rocking object, wherein the rocking device comprises:
     only three supporting means for rotatably supporting said rocking object; and
     only three driving means for rocking said rocking object using said supporting means,
     each of said driving means being drivingly controlled to thereby roll, pitch and heave said rocking object; and
   a control device for controlling a three-dimensional image and sound transmitted to said rocking object.

8. A bodily sensation simulation apparatus according to claim 7, wherein said rocking object for supporting said user has a fixing device for fixing said user to a predetermined position; a visual sensation device for individually displaying a three-dimensional image to said user; and an auditory device for transmitting sound to said user.

9. A bodily sensation simulation apparatus according to claim 8, wherein said fixing device is equipped with a visual sensation device for displaying said three-dimensional image.

10. A bodily sensation simulation apparatus according to claim 7, wherein said control device comprises:
    a CPU for controlling said bodily sensation simulation apparatus;
    a memory for accumulating a video file and an audio file;
    a switch for starting and stopping;
    a circuit for controlling safety; and
    a circuit for controlling motors.

11. A bodily sensation simulation apparatus according to claim 7, wherein said control device controls said three-dimensional image and sound to be synchronized with movements of said rocking object.

12. A bodily sensation simulation apparatus according to claim 7, wherein said control device controls the operation of a fan to be synchronized with movements of said rocking object.

* * * * *